Patented Jan. 2, 1951

2,536,018

UNITED STATES PATENT OFFICE 2,536,018

COATING COMPOSITIONS

Daniel Schoenholz and Herbert Terry,
New York, N. Y.

No Drawing. Application June 16, 1948,
Serial No. 33,436

7 Claims. (Cl. 260—28.5)

INTRODUCTION

This invention relates to paper finishing compositions and more particularly to emulsion compositions containing as a main film forming constituent polyvinyl acetate.

It is usual to provide paper book covers, playing cards and other printed paper articles which are subjected to considerable handling, with a glossy coating designed to improve their appearance and wear-resistance. So far, the applicants know of no polyvinyl acetate emulsion which has been successfully used for this purpose.

APPLICANTS' DEVELOPMENT

The applicants have developed a class of compositions containing polyvinyl acetate as a main film-forming constituent, which are excellent for the above purpose. These compositions can be applied to the paper surface as a thin layer and dried to give a glossy continuous water- and grease-resistant non-blocking film. The coating does not cause the printing inks, dyes or pigments to bleed.

The compositions of the invention are coating materials suitable for finishing paper. They are made by admixing an aqueous dispersion of polyvinyl acetate resin having a viscosity within the range from about 21 to about 100 centipoises in which the resin has an average particle size not greater than about .6 micron with an aqueous dispersion of wax having a particle size not greater than about .6 micron. The polyvinyl acetate dispersion contains organic hydrophilic colloid in amounts from about .5 to about 3 parts to 100 parts of the resin and a surface-active agent selected from the group consisting of anionic, non-ionic, mixtures of non-ionic and cationic, and mixtures of non-ionic, anionic and cationic, in which the anionic or cationic agent is present in definite excess of its stoichiometric combining weights, the surface-active agent being present in an amount from about .1 to about .5 part of the dispersion. The concentration of the constituents in the composition is such that in the final dispersion the wax dispersion solids range from about 4 to about 20 parts of which about 80% to 90% is wax, the surface-active agent ranges from about .8 to about 8 parts, and the polyvinyl acetate resin makes up the total of 100 parts. The parts are expressed in parts of non-volatile solids per 100 parts of total non-volatile solids in the final composition which run from about 12% to about 60%. The invention also includes a method of forming a paper-finishing composition which comprises bringing together and intimately mixing an aqueous dispersion of polyvinyl acetate of the type described with an aqueous dispersion of wax of the type described.

The particle size of the resin and of the wax are below the point at which, when laid down in a film, light reflection causes dullness. The surface active material is of a type which is dispersible in the aqueous medium and in the polyvinyl acetate and one which is "optically compatible," i. e. which will not cause cloudiness in a film formed from the composition. This surface active material may be an anionic or non-ionic agent, a combination of anionic and non-ionic agents, a combination of non-ionic and cationic agents, or a combination of non-ionic, anionic, and cationic agents in which either of the ionic agents is present in definite excess of their stoichiometric combining weights. The composition may also contain plasticizer for the polyvinyl acetate.

Films are laid down from this composition in the usual manner and provide a glossy finish. They do not cause bleeding of inks, dyes or pigments which may have been used in printing designs or illustrations on the coated surface. The nature of the coating is effective to improve water-resistance and to prevent blocking or adhesion of coated surfaces in contact with each other under pressure, elevated temperature, and humidity. High flexibility may be achieved by incorporating a plasticizer into the composition.

In addition to the properties mentioned above, our compositions have many additional advantages including economy as to cost as compared to conventionally used solvent lacquers, absence of fire hazards and of the necessity for using solvent recovery equipment.

When applied and dried by evaporation of water in a suitable oven or drying tunnel our compositions leave behind a hard, tough, durable film of excellent clarity and gloss, high resistance to abrasion, to oils, greases and water, are non-blocking, and have a controllable degree of slipperiness due to the waxes used. Gloss may further be enhanced if desired by hot press polishing or hot calendering the dried coated articles.

COMPONENTS

Resin dispersion

As the resin in the dispersion there is used an emulsion-polymerized polyvinyl acetate of resinous consistency. In preparing this dispersed resin there is used to advantage as a protective colloid gum arabic, in the proportion of 0.5 to 3 parts for 100 parts of the vinyl acetate dispersion and a surface active agent, preferably di-n-octyl sodium sulfosuccinate, in proportion of 0.1 to 0.5 part. The resin must be in the form of extremely fine particles of size averaging 0.6 micron or lower, preferably below an average of 0.3 micron, down to the finest that can be produced. Particles averaging larger than 0.6 micron on the other hand do not give films which dry with a gloss under all conditions of use. For glossiest films from the applied and dried dispersions, we use particles of maximum average size of 0.25 micron down to submicroscopic sizes. The polyvinyl acetate is usually present in the dispersion in an amount ranging from about 10% to about 40% by weight, but may sometimes range up to about 60%. The polyvinyl acetate viscosity may range from about 21 to about 80 or 100 centipoises, but a considerable proportion of the polyvinyl acetate may be insoluble, as is usual with this material. Any organic hydrophilic colloid which is effective to stabilize low particle size emulsions may be used, with gum arabic preferred.

Surface active agent

As the surface active agent, there is used either an anionic or non-ionic agent. Combinations of anionics and non-ionics may be used and also combinations of non-ionic and cationic, or mixtures of non-ionic, anionic, and cationic in which either the anionic or cationic is present in definite excess of their stoichiometric combining weights. The agents used must be dispersible in water and in the polyvinyl acetate resin so that there is no clouding of the final finish film.

Examples of surface active agents that meet these general requirements are di-n-octyl sodium sulfosuccinate known commercially as Aerosol OT, the oleic acid condensate of polyethylene oxide (Neutronyx 228), the sodium salt of a secondary alkyl sulfate (Tergitol penetrant No. 4), the aryl alkyl polyether alcohol (Triton NE), the aryl polyether alcohol (Advawet 10), the ethanolated alkyl guanidine amine complex (Aerosol C-61), dodecyl dimethyl hydroxyethyl ammonium chloride (Quatronyx), the oleic acid amide of hydroxy ethyl ethylene diamine (Catylon C).

The surface active agent in the final compositions will range from about 0.8 to about 8% of the total solids. This is made up of surface active agent appearing in the original polyvinyl acetate dispersion and in the wax dispersion and also per cent surface active agent added as such.

The resin emulsion may, of course, contain other constituents. For example, it is common practice to add other constituents either before, during or after polymerization to produce particular effects. For one example, materials are added which react with the monomer or polymer during polymerization and become a part of the resultant polymer. In other instances, materials are added after the emulsion is formed so as to produce modifying effects on the film formed from the emulsion. These modifications do not affect the making of the composition according to the present invention or their use in the compositions described.

Plasticizer

It is not always necessary to use a plasticizer for the polyvinyl acetate resin since the degree of flexibility desired is sufficient for some applications without plasticizer being added. However, in applications where plasticizer is desired any of the usual polyvinyl acetate plasticizers may be used such as dibutyl phthalate, butyl phthalyl butyl glycolate, tricresyl phosphate, triethylene glycol di-2-ethyl hexoate.

Wax emulsions

The waxes used are of the types conventionally used in wax dispersion. Examples are carnauba, candelilla, ouricuri, montan, oxidized petroleum waxes, and mixtures of these with hydrocarbon waxes such as paraffin and deoiled microcrystalline waxes. The wax dispersion is of the type known as a "substantially bright-drying" wax dispersion which when laid down in a film and permitted to dry forms a glossy film without the necessity for buffing. The surface is, however, heat-treated. The melting point of the wax is such that it should ordinarily be molten below 212° F. The particle size of the wax is below .6 micron and goes down as low as .05 micron. Below 0.6 micron is the operative range. Actually, the so-called "bright-drying" wax dispersions contain waxes whose particles lie below 0.25 micron, but you can use waxes which would not normally be used in dispersions termed "bright-drying" and those up between 0.25 and 0.6 so we have called the over-all class "substantially bright-drying waxes."

When the coating is dried and subjected to a temperature in excess of the melting point of the dispersed wax, the wax which is not soluble in the resin component melts and blooms to the surface thereby providing a protective antiblocking film.

The wax component is incorporated in water-dispersed form and may be a soap-stabilized dispersion with pH in the range of 7 to 10 in which case the polyvinyl acetate dispersion must first be adjusted in pH to within this range prior to mixing. A composition of this type will be generally suitable for use over paper printed with alkali stable dyes or pigments.

When it is necessary to coat papers on which the dyes or pigments used are stable to acids but not to alkalis a special type of wax dispersion so formulated as to be stable to acid pH is added to the originally acid polyvinyl acetate dispersion. This may be accomplished by using a wax dispersion containing a non-ionic emulsifier, as for example sorbitan palmitate, which is not affected by the acid pH of the resin emulsion. A small amount of base is usually present in the wax dispersion to neutralize the fatty acids present in the wax, but the major emulsifier is the non-ionic surface active agent.

The types of wax dispersions used will be illustrated by example.

PROPORTIONS

Proportions of the several components may be varied in accordance with the properties of the film required in different uses of our invention.

Operative and preferred proportions are shown in general in the following table, all proportions in this table and elsewhere herein being expressed as parts by weight.

*Parts of non-volatile matter per 100 parts of total non-volatile*

| Ingredient | Satisfactory Range | Preferred Range |
|---|---|---|
| Wax Dispersion Solids | 4 –20 | 8 –15 |
| Added Surface Active Agent | 0 –4 | 0 – 1.5 |
| Total Surface Active Agent | 0.8–6 | .8– 4 |
| Plasticizer | 0 –4 | 0.5– 1.5 |
| Polyvinyl Acetate Dispersion Solids | to make 100 parts total. | |

In the wax dispersion solids, 80% to 90% is wax, the remainder being principally surface active agent. The polyvinyl acetate dispersion solids contain resin, surface active agent, emulsifying agent and so on. The surface active agent figure refers to added surface active agent, as distinct from that contained in the original wax and polyvinyl acetate dispersions.

APPLICATION

The coating compositions of the invention are applied to paper surfaces in the usual manner. They are then preferably subjected to drying at a temperature ranging from about 180° F. to about 250° F. This heat treatment melts the wax and subdues the tendency of any large particles to cause dullness. If the surface has been printed with acid stable materials, an acid stable composition is applied. If the surface has been printed with alkali stable materials the alkali stable type of composition is applied.

EXAMPLES

*Preparation of P. V. A. dispersion*

In order to illustrate the invention more specifically, reference will be made first to the method of preparation of the polyvinyl acetate dispersion used and also to the method of preparing the wax dispersions.

These examples are intended to illustrate but not to limit the scope of the invention.

*Polyvinyl acetate dispersion*

| | Parts |
|---|---|
| Vinyl acetate | 33 |
| Water | 64 |
| Gum arabic | 2.5 |
| Sodium alkyl arylsulfonate | 0.3 |
| $FeCl_3 6H_2O$ | 0.003 |
| Hydrogen peroxide | 0.04 |

About 10% of the vinyl acetate, 25% of the hydrogen peroxide and all of the remaining ingredients listed above are charged into a reaction vessel equipped with heating and cooling means, an agitator and a water cooled return condenser. The mixture is then heated to about 75–85° C. with moderate agitation and while continuing the agitation and at the same temperature, 75% of the remaining hydrogen peroxide (in a 0.3% aqueous solution) and all of the remaining vinyl acetate are slowly added.

The rate of addition of these ingredients is such that maintenance of the 75–85° C. temperature is possible with little or no refluxing. About 1 to 3 hours are usually required. After all the vinyl acetate is added the remainder of the hydrogen peroxide in a 0.3% aqueous solution is introduced and the temperature of the mixture is raised to 85 to 90° C. After 15 to 30 minutes at this temperature, the emulsion is cooled to room temperature.

The analysis of the product runs as follows:

| | |
|---|---|
| Percent total solids | 34.35 |
| Percent residual monomer | 0.36 |
| Percent residual acid | 0.71 |
| Emulsion viscosity (Brabender) | 300 cps. |
| Polyvinyl acetate viscosity | 20.8 cps. |
| pH | 3.85 |
| Percent insoluble resin | 14.25 |
| Particle size | Less than 0.2 micron. |

PREPARATION OF WAX DISPERSIONS

*Alkaline wax dispersions*

| Part A: | Percent |
|---|---|
| De-oiled microcrystalline wax, melting pt. 197° F. | 3.65 |
| Carnauba wax | 1.83 |
| Candelilla wax | 3.65 |
| Oleic acid | 1.65 |
| Triethanolamine | .83 |
| Part B: | |
| Borax | .83 |
| Water | 4.95 |
| Part C: | |
| Water | 82.61 |
| | 100 |

The waxes of part A are placed in a jacketed kettle equipped with an agitator. The kettle should be capable of being heated by the circulation of steam in the jacket and of being cooled by the circulation of cold water. The waxes of part A are placed in the kettle and melted. After melting they are stirred to obtained uniformity and the temperature is adjusted to 200–210° F. The oleic acid and triethanolamine are then added and stirred in.

Part B is prepared by dissolving the borax in hot water at 200–210° F. and stirring the solution into the batch in the wax kettle.

After part B has been uniformly mixed with the batch the water of part C is added hot (200–210° F.) slowly at first and then more rapidly after the viscosity of the batch has shown a sharp decrease. When all of part C has been added, the batch is cooled and is then ready for use. Uniform and strong agitation should be used throughout the preparation of the dispersion.

*Acid stable wax dispersion*

| Part A: | Percent |
|---|---|
| De-oiled microcrystalline wax, melting pt. 197° F. | 4.48 |
| Oxidized microcrystalline wax | 4.48 |
| Carnauba wax | 1.65 |
| Sorbitan palmitate (Atlas G2000S) | 1.41 |
| Part B: | |
| Monoethylamine (70%) | 0.94 |
| Water | 6.35 |
| Part C: | |
| Water | 80.69 |
| | 100 |

The substances indicated in part A are melted and stirred together at a temperature of 200 to 210° F. Part B is prepared by dissolving the monoethylamine in the indicated quantity of water and heating to 150° F. This solution is then rapidly stirred into the mixture of molten waxes (part A).

The water indicated in part C previously heated to 200–210° F. is then added and stirred in slowly at first and then more rapidly after the viscosity of the batch decreases and foam is formed. The batch is then cooled to room temperature and is ready for use.

PREPARATION OF COMPLETED PAPER FINISHING COMPOSITIONS

In the following examples, the figures represent parts by weight.

Example 1

Part A:
Polyvinyl acetate dispersion (35%) -- 78.46
Ammonia 28%, 26° Bé -- 1.0
Part B:
Neutronyx 228, the oleic acid condensate of polyethylene oxide (25% aqueous dispersion) -- 0.62
Aerosol OT, di-n-octyl sodium sulfosuccinate (25% aqueous dispersion) -- 0.62
Dibutyl phthalate -- 0.3
Part C:
Alkaline wax dispersion -- 19.0
———
100.00

Example 2

Part A:
Polyvinyl acetate dispersion (35%) -- 78.86
Ammonia 28%, 26° Bé -- 1.0
Part B:
Neutronyx 228, the oleic acid condensate of polyethylene oxide (25% aqueous dispersion) -- 0.62
Aerosol OT, di-n-octyl sodium sulfosuccinate (25% aqueous dispersion) -- 0.62
Part C:
Alkaline wax dispersion -- 19.0
———
100.00

Example 3

Part A:
Polyvinyl acetate dispersion (35%) -- 79.26
Part B:
Neutronyx 228, the oleic condensate of polyethylene oxide (25% aqueous dispersion) -- 0.31
Aerosol OT, di-n-octyl sodium sulfosuccinate (25% aqueous dispersion) -- 0.31
Dibutyl phthalate -- 0.3
Part C:
Neutronyx 228, the oleic acid condensate of polyethylene oxide (25% aqueous dispersion) -- 0.31
Aerosol OT, di-n-octyl sodium sulfosuccinate (25% aqueous dispersion) -- 0.31
Acid stable wax dispersion -- 19.2
———
100.00

Example 4

Part A:
Polyvinyl acetate dispersion (35%) -- 79.26
Part B:
Neutronyx 228, the oleic acid condensate of polyethylene oxide (25% aqueous dispersion) -- 0.31
Aerosol OT, di-n-octyl sodium sulfosuccinate (25% aqueous dispersion) -- 0.31
Part C:
Neutronyx 228, the oleic acid condensate of polyethylene oxide (25% aqueous dispersion) -- 0.31
Aerosol OT, di-n-octyl sodium sulfosuccinate (25% aqueous dispersion) -- 0.31
Acid stable wax dispersion -- 19.5
———
100.00

Example 5

The composition of Example 1 was applied as a coating to a paper book cover printed with alkali stable dyes. The resulting cover had a glossy appearance and high resistance to grease, oils and water and to abrasion, and was non-blocking. It also had excellent clarity and gloss.

Example 6

A coating was applied to a paper book cover similarly to Example 5 and was press polished. In addition to the qualities described in the previous example, the cover had a high gloss.

Example 7

A paper book cover printed with acid stable dyes was coated with the composition of Example 3. The characteristics of the coating were substantially as described in Example 5.

METHOD OF COMPOUNDING

To prepare any of the finishing compositions exemplified, the components are combined by mixing together in the order indicated. Each part indicated in the formula is prepared as a separate mixture by agitation and combined with the previous part.

It is to be understood that the total composition can then be diluted with water to desirable non-volatiles content prior to coating.

It is further to be understood that other surface-active agents, plasticizers and waxes may be used in the typical formulations shown.

The sub-titles used throughout the specification are merely to simplify reference thereto and should otherwise be disregarded.

We claim:

1. A coating composition suitable for finishing paper made by admixing an aqueous dispersion of polyvinyl acetate resin having a viscosity within the range from about 21 to about 100 centipoises in which the resin has an average particle size not greater than about .6 micron, said dispersion containing organic hydrophilic colloid in amounts from about .5 to about 3 parts to 100 parts of the resin, surface active agent selected from the group consisting of anionic, non-ionic, mixtures of non-ionic and cationic and mixtures of non-ionic, anionic and cationic in which the anionic or cationic agent is present in definite excess of its stoichiometric combining weight, the surface active agent being present in amount from about .1 to about .5 part of the dispersion, and an aqueous dispersion of wax having a particle size not greater than about .6 micron, the concentration of the constituents being such that in the final dispersion the wax dispersion solids range from about 4 to about 20 parts of which about 80 to about 90% is wax, surface active agent ranges from about 0.8 to about 8 parts, and the polyvinyl acetate resin makes up the total of 100 parts, the parts being expressed in parts of non-volatile solids per 100 parts of total non-volatile solids in the final composition running from about 12% to about 60%.

2. A paper finishing composition, according to claim 1, which is acid in pH and capable of being used in contact with pigments and dyes which are not bled by acid conditions but which are bled by alkaline conditions.

3. A paper finishing composition, according to claim 1, which is alkaline in pH and capable of being used in contact with pigments and dyes which are not bled by alkaline conditions but which are bled by acid conditions.

4. A method of forming a paper finishing composition, comprising, bringing together and intimately mixing (a) an aqueous dispersion of a polyvinyl acetate resin having a viscosity within the range from about 21 to about 100 centipoises in which the average particle size of the resin is not greater than about .6 micron and containing from about .5 to about 3 parts of an organic hydrophilic colloid to 100 parts of the resin dispersion and containing a surface active agent selected from the group consisting of anionic, non-ionic, mixtures of non-ionic and cationic and mixtures of non-ionic, anionic and cationic in which the anionic or cationic agent is present in definite excess of its stoichiometric combining weight, the surface active agent being present in amount from about 0.1 to about 0.5 part of the resin dispersion and (b) an aqueous dispersion of a wax having a melting point such that it does not soften or melt below 125° F., in which the particle size is not greater than about 0.6 micron, the pH of the wax dispersion being within the range from 7 to 10, the concentration of the constituents being such that in the final dispersion the wax dispersion solids range from about 4 to about 20 parts of which about 80% to about 90% is wax, surface active agent ranges from about 0.8 to about 8 parts, and the polyvinyl acetate resin makes up the total of 100 parts, the parts being expressed in terms of parts of non-volatile solids per 100 parts of total non-volatile solids in the final composition running from about 12% to about 60%.

5. A method, according to claim 4, in which the wax dispersion is an alkaline wax dispersion and the polyvinyl acetate dispersion is made alkaline before addition by the incorporation therein of a base.

6. A method of finishing a paper surface, comprising, applying to the surface a composition, according to claim 1, to form a thin layer of the dispersion, and then drying the film at a temperature ranging from about 180° F. to about 250° F. thereby to form a continuous film.

7. A printed paper article having as a coating thereon a dried film of the composition of claim 1, the coating being in the form of a thin glossy continuous water- and grease-resistant non-blocking transparent film, there being no bleeding of the printing on the paper.

DANIEL SCHOENHOLZ.
HERBERT TERRY.

REFERENCES CITED

The following references are of record in the file of this patent:

UNITED STATES PATENTS

| Number | Name | Date |
| --- | --- | --- |
| 2,413,197 | Smith et al. | Dec. 24, 1946 |